3,378,443
ANHYDROUS LIQUID SUSPENSIONS
OF BIOLOGICS
Murray Sam Cooper, Dumont, N.J., and Irvin Sigwald
Danielson, Pearl River, and Henry Michael Kroll,
Nanuet, N.Y., assignors to American Cyanamid Company, Stamford, Conn., a corporation of Maine
No Drawing. Continuation-in-part of application Ser. No. 46,045, July 29, 1960. This application Apr. 5, 1966, Ser. No. 540,219
5 Claims. (Cl. 167—78)

ABSTRACT OF THE DISCLOSURE

Bulk shippable, storage stable compositions containing a dried, preferably freeze-dried, biological such as a vaccine, serum or antigen suspended in a dry liquid polyorganosiloxane such as a silicone.

---

This is a continuation-in-part of our application Ser. No. 46,045 filed July 29, 1960, now abandoned.

Generally stated, the subject matter of the present invention relates to biological compositions. More particularly, the invention relates to a bulk shippable, storage stable biological composition comprising dried particles of a biological. Furthermore, the invention relates to a method of preparing a bulk shippable, storage stable biological composition.

As employed in the instant specification and claims, the term biological shall be defined to include those substances disclosed in Remington's Practice Of Pharmacy, twelfth edition, 1961, part VI, pages 1369–1402, as well as enzymatic compositions such as streptokinase and streptodornase. Therefore, the term is applicable to materials such as bacterial vaccines and toxoids, viral vaccines, rickettsial vaccines, antitoxins, immune serums, antivenims, diagnostic antigens, allergenic extracts, enzymatic preparations and the like.

The problems inherent in the shipping and storage of biologicals are occasioned by their instability, since biologicals are usually prepared in an aqueous media and contain substances such as proteins, lipids and the like. Effective storage, for a reasonable length of time, can be achieved by storing the biologicals at low temperatures. However, there is a loss of potency with time, which is enormously accelerated in the absence of continuous refrigeration. Attempting to obviate these problems, the common practice has been to lyophilize the bioglocial and ship the lyophilized material under conditions which would insure maintenance of the dry state. The dried biological is then shipped, with or without a solid diluent, in final packages, usually vials which have been vacuum sealed and filled with an inert atmosphere such as nitrogen.

Where the shipping distance is not excessive, the above method, although not desirable for maximum shipping economy, has been actually used. However, with regard to those instances in which the shipping distance is excessive, costs have been materially effected since the individual vials packed in large containers present a significant increase in the cost of shipping.

The present invention represents the culmination of a long series of investigations conducted largely by the inventors and their associates in the problem inherent in the shipping and storage of dried biologicals. The inventive concept of the present invention resides in the discovery that a bulk shippable, storage stable biological may be obtained by admixing the dried biological in a substantially anhydrous medium, which will not adversely effect the potency of the biological.

The advantages which inure to the art should be readily apparent, since the novel composition of the present invention enables the shipment of biologicals in large containers, from 10 to 100 liters in capacity, the compositions are relatively stable, do not rapidly lose their potency and the enormous cost of individual container shipment is obviated. At the same time the use of the substantially anhydrous medium eliminates the problems of vacuum sealing, since the biological is protected from any entrance of moisture or air with a simple seal. In addition, the cost of utilizing an inert atmosphere such as nitrogen is also eliminated.

The advent of the present invention therefore, makes available a product, which is a composition of a dried biological, preferably prepared by lyophilization, in a substantially anhydrous medium which will not adversely effect the potency of the biological. Depending on the relative safety of the particular medium employed, same is either removed in whole or in part prior to administration of the biological. When all of the substantially anhydrous medium is to be removed prior to use, said medium should have a reasonably high volatility, so as to insure the ease of removal of same. It is desirable that the anhydrous medium be substantially dry, however, as a consequence to residual moisture present in both the dried biological and said medium the final composition is not completely anhydrous. However, it is quite stable.

Therefore, the invention relates to a bulk shippable, storage stable composition, comprising a dried biological and a member selected from the group consisting of polyorganosiloxanes, halogenated lower alkanes and purified mineral oils.

In addition, the invention relates to a method of preparing a bulk shippable, storage stable biological composition which comprises admixing a dried biological and a member selected from the group consisting of polyorganosiloxanes, halogenated lower alkanes and purified mineral oils.

The substantially anhydrous mediums employed in the novel composition of the present invention are hereinafter set forth in the order of their general desirability, they are as follows:

The polyorganosiloxanes are compounds having the following general formula, in which R is an organic radical:

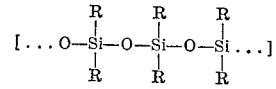

When R is methyl the compounds are generally referred to as silicones. The polyorganosiloxanes may be straight chain polymers or there may be some cross-linking, and they are freely available in a wide range of molecular weights. With regard to the present invention the lower molecular weight products, which are liquids, compatible with biologicals and have satisfactory viscosities and toxicities are preferred. Furthermore, as a consequence to their relative safety the polyorganosiloxanes may be retained in whole or part, as the diluent of the biological composition to be administered.

The halogenated lower alkanes, particularly the fluorine containing compounds such as chloro or bromo fluoroalkanes, are readily available as they are extensively used as propellents, as well as refrigerants. However, not all of the halogenated lower alkanes are practically useful, since some of the halogenated lower alkanes are gases with very low boiling points and while they can be used in the present invention, they are not preferred since the pressure developed in a shipping container would require a more expensive type of container. When the container problem is not a serious one, even the lower boiling halogenated lower alkanes may be useful, as for example, the cyclic fluorocarbon $C_4F_8$, which boils at $-6°$ C., represents about as volatile a compound as is practically useful. The more moderate boiling compounds are preferred and illustrative of same are dichlorotetrafluoroethane, dichlorofluoromethane, trichlorofluoromethane, trichlorotrifluoroethane, tetrachlorodifluoroethane, and the like. Dibromotetrafluoroethane is also useful, but its considerably higher price renders it less desirable from an economic standpoint.

Lastly, the purified mineral oils as employed in the instant specification and claims, shall be defined as those mineral oils from which the aromatics have been removed, and demonstrate no fluorescence when checked at 360 millimicrons. Illustrative of the purified mineral oils are those compositions available under the trade names "Bayol F," supplied by the Humble Oil and Refining Co., and "Drakeol 6," supplied by the Pennsylvania Refining Co.

While the various substantially anhydrous mediums hereinabove set forth are more or less equivalent, the problems presented when the novel compositions of the present invention reach their destination will usually dictate to some extent the particular medium to be employed. When the medium is to be completely removed at the point of destination this has a two-fold result; namely, the scope of the substantially anhydrous mediums which can be employed is broadened, since the relative safety of the medium is not critical, and secondly, consideration must be given to the boiling point of the medium to be employed, since a medium which has a relatively low boiling point is easily removed and is, therefore, advantageous.

With regard to some uses it may be desirable to retain the substantially anhydrous medium in whole or part, and in this instance the question of low boiling points is of relatively less importance. However, this presents a drastic limitation on the choice of mediums, since the medium employed must be relatively safe, and it is in this regard that the polyorganosiloxanes are preferred. In those instances in which an anhydrous medium is retained in whole or in part the cost of reconstituting the dried biological at the point of destination are substantially reduced, since the composition is easily handled, and the filling of individual containers is greatly simplified. This possibility of the direct use of compositions of certain biologicals and polyorganosiloxanes makes such compositions a preferred embodiment of the present invention.

A further advantage is realized with the use of the relatively safe polyorganosiloxanes and allergen extracts, since a non-aqueous suspension of polyorganosiloxane and an allergen extract is not subject to rapid diffusion, thereby obviating what is considered to be one of the primary causes of anaphylactic reactions occasioned by the administration of allergen extracts.

The following examples are provided for illustrative purposes and may include particular features of the invention. However, the examples should not be construed as limiting the invention, many variations of which are possible without departing from the spirit or scope thereof.

Example I.—Utilization of the inventive concept of the present invention in the preparation of a bulk shippable, storage stable composition of Newcastle disease vaccine This example demonstrates the utilization of the inventive concept of the present invention in the preparation of a bulk shippable, storage stable biological composition, in which the biological is Newcastle disease vaccine.

A 300 ml. sample of aqueous Newcastle disease vaccine was introduced into a bottle and the vaccine was shell-frozen at $-70°$ C. During freezing the bottle was rotated on its long axis to form a frozen shell of vaccine on the interior wall of the bottle. Frozen vaccine was then dried under high vacuum at $-40°$ C. The temperature was then permitted to rise to $37°$ C. until an ultimate pressure of approximately 5 microns of mercury was reached. The bottle was removed and 80 ml. of a silicone liquid of 5 centistokes viscosity was added and the dried vaccine triturated to form a suspension. A slurry was produced which was suitable for filling into containers for transportation, filling taking place under aseptic, anhydrous conditions.

Portions of the vaccine suspension were incubated at $35°$ C. and samples were titrated after 2 weeks and 4 weeks incubation, respectively. The virus titre did not significantly change.

Example II.—Utilization of the inventive concept of the present invention in the preparation of a bulk shippable, storage stable composition of rabies vaccine This example represents the utilization of the inventive concept of the present invention in the preparation of a bulk shippable, storage stable biological composition, in which the biological is rabies vaccine.

The procedure of Example I was repeated, replacing Newcastle disease vaccine with 300 ml. of rabies vaccine. The composition demonstrated substantially the same degree of effective stability as demonstrated in Example I.

Example III.—Utilization of a polyorganosiloxane of higher viscosity

This example demonstrates the effectiveness of polyorganosiloxanes of higher viscosity.

The procedure of Example I was repeated, with the exception that a polyorganosiloxane of 20 centistokes viscosity was used and instead of Newcastle disease vaccine 300 ml. of smallpox vaccine was used. The amount of polyorganosiloxane was 150 ml.

The biological composition demonstrated substantially the same effective stability as was demonstrated in Example I. Furthermore, the biological composition was used with suitable dilution as a vaccine employing conventional inoculation methods.

Example IV.—Utilization of a polyorganosiloxane of higher viscosity

This example demonstrates the effectiveness of polyorganosiloxanes of higher viscosity.

The procedure of Example III was repeated, replacing the smallpox vaccine with hog cholera vaccine. A stable product was produced which demonstrated substantially the same stability as demonstrated in Example I.

Example V.—Utilization of a polyorganosiloxane of higher viscosity

This example demonstrates the effectiveness of polyorganosiloxanes of higher viscosity.

The procedure of Example III was repeated in which smallpox vaccine was replaced with canine distemper vaccine. A stable product was produced which demonstrated substantially the same stability as demonstrated in Example I.

Example VI.—Utilization of a polyorganosiloxane of higher viscosity

This example demonstrates the effectiveness of polyorganosiloxanes of higher viscosity.

The procedure of Example III was repeated, with the exception that a polyorganosiloxane of 10,000 centistokes viscosity was used. The amount of polyorganosiloxane was 300 ml.

A stable product was produced which demonstrated substantially the same stability as demonstrated in Example I.

Example VII.—Utilization of the inventive concept of the present invention in the preparation of a bulk shippable, storage stable composition of an enzyme preparation This example demonstrates the utilization of the inventive concept of the present invention with an enzyme preparation.

A series of vials containing 100,000 units of streptokinase, 25,000 units of streptodornase and human plasminogen as a dried preparation were divided into four portions of two vials each. The first portion was refrigerated at 4–10° C. for 3 days in the form of a dry powder and then reconstituted with distilled water. The second portion was reconstituted with the same amount of distilled water and then refrigerated at from 4–10° C. for 3 days. The third portion was reconstituted with distilled water and allowed to stand at room temperature 26° C., for 1 day, and finally the fourth portion was suspended in silicone fluid sold by Dow Corning under the designation DC200, the amount being the same as the distilled water used in reconstituting portions one to three. The suspension was allowed to stand at 26° C. for 9 days and was then extracted with distilled water.

All four portions were tested for potency. The first and second portion which had been refrigerated either dry or wet for 1 day showed no loss of potency neither did the suspension in silicone fluid which had been stored at room temperature for 9 days. However, the third portion which had stood wet for only 1 day at room temperature had lost 70% of its potency.

The above enzyme preparations which are used for dissolving blood clots and for other biologicals in connection with injuries requiring debridement have always been thought to require refrigeration on storage, particularly after reconstitution with water. The above described tests clearly bear out the necessity for such precautions. However, the suspension in polyorganosiloxane according to the present invention, keeps well and can be shipped. Furthermore, it has been found that the suspension of the enzyme in the polyorganosiloxane not only keeps well but also can be used parenterally without removing the silicone. No irritation or other undesirable side effects are noted in domestic animals when so used. The product, therefore, which keeps well at room temperature can be used directly without any reconstitution with water.

Example VIII.—Utilization of other anhydrous mediums in a bulk shippable, storage stable composition of an enzyme preparation This example demonstrates the successful employment of a halogenated lower alkane and a purified mineral oil in the preparation of a bulk shippable, storage stable composition of an enzyme preparation.

The procedure of Example VII was repeated substituting for the polyorganosiloxane the halogenated lower alkane trichlorotrifluoroethane in one instance, and the purified mineral oil "Bayol F" in the other instance.

The purified mineral oil "Bayol F," supplied by the Humble Oil and Refining Co., has the following specifications: A Saybolt viscosity at 100° F. of 53. A specific gravity at 60° F. of 0.828. A Saybolt color of +30. A pour point of 35° F. A reflective index of 1.4540, and a distillation range of 545 to 750° F.

Stable products were produced in both instances, and substantially the same stability was demonstrated in Example VII.

Example IX.—Utilization of a halogenated lower alkane in the preparation of a bulk shippable, storage stable composition of Newcastle disease vaccine This example demonstrates the successful employment of a halogenated lower alkane in the preparation of a bulk shippable, storage stable composition of Newcastle disease vaccine.

The procedure of Example I was repeated, with the exception that the anhydrous medium employed was trichlorotrifluoroethane.

On incubating at 35° C., and titrating after two and four weeks there was a negligible loss in potency.

Example X.—Utilization of a halogenated lower alkane in the preparation of a bulk shippable, storage stable composition of canine rabies vaccine This example demonstrates the successful employment of a halogenated lower alkane in the preparation of a bulk shippable, storage stable composition of canine rabies vaccine.

The procedure of Example IX was repeated with the exception that 100 ml. of the halogenated lower alkane trichlorotrifluoroethane was used with 300 ml. of canine rabies vaccine.

A bulk shippable, storage stable product was obtained which demonstrated substantially the same stability as demonstrated in Example IX.

Example XI.—Utilization of a halogenated lower alkane in the preparation of a bulk shippable, storage stable composition of canine distemper vaccine This example demonstrates the successful employment of a halogenated lower alkane in the preparation of a bulk shippable, storage stable composition of canine distemper vaccine.

The procedure of Example IX was repeated with the exception that canine distemper vaccine was used.

A bulk shippable, storage stable product was obtained which demonstrated substantially the same stability as demonstrated in Example IX.

*Example XII*

The behavior of several additional halogenated lower alkanes was tested by repeating the procedure of Example IX, using a combiantion of Newcastle disease vaccine and infectious bronchitis vaccine. Two anhydrous mediums were used as a mixture, namely, trichlorofluoromethane and dichlorodifluoromethane.

The compositions were stored at 37° C. for fourteen and twenty-one days. A small drop in titer was observed at fourteen days which did not significantly increase in the samples stored twenty-one days.

Example XIII.—Utilization of a purified mineral oil in the preparation of a bulk shippable, storage stable composition of Newcastle disease vaccine This example demonstrates the successful employment of a purified mineral oil in the preparation of a bulk shippable, storage stable composition of Newcastle disease vaccine.

The procedure of Example I was repeated, with the exception that the anhydrous medium employed was the purified mineral oil "Drakeol 6," supplied by the Pennsylvania Refining Co., having the following specifications: A Saybolt viscosity at 100° F. of 55. A specific gravity at 60° F. of .837. A pour point of 15° F., and a Saybolt color of +30.

After storage at 37° C. for fourteen days, only a slight decrease in titer was observed.

Example XIV.—Utilization of a purified mineral oil in the preparation of a bulk shippable, storage stable composition of infectious bronchitis virus This example demonstrates the successful employment of a purified mineral oil in the preparation of a bulk shippable, storage stable composition of infectious bronchitis virus.

The procedure of Example XIII was repeated with the exception that infectious bronchitis virus was used. A bulk shippable, storage stable product was obtained which demonstrated substantially the same stability as demonstrated in Example XIII.

Example XV.—Utilization of a purified mineral oil in the preparation of a bulk shippable, storage stable composition of hog cholera This example demonstrates the successful employment of a purified mineral oil in the preparation of a bulk shippable, storage stable composition of hog cholera.

The procedure of Example XIII was repeated with the exception that hog cholera was used. A bulk shippable, storage stable product was obtained which demonstrated the same stability as demonstrated in Example XIII.

Example XVI.—Utilization of a purified mineral oil in the preparation of a bulk shippable, storage stable composition of canine distemper This example demonstrates the successful employment of a purified mineral oil in the preparation of a bulk shippable, storage stable composition of canine distemper.

The procedure of Example XIII was repeated with the exception that canine distemper was used. A bulk shippable, storage stable product was obtained which demonstrated the same stability as demonstrated in Example XIII.

Example XVII.—Utilization of a purified mineral oil in the preparation of a bulk shippable, storage stable composition of canine rabies vaccine This example demonstrates the successful employment of a purified mineral oil in the preparation of a bulk shippable, storage stable composition of canine rabies vaccine.

The procedure of Example XIII was repeated with the exception that canine rabies vaccine was used. A bulk shippable, storage stable product was obtained which demonstrated the same stability as demonstrated in Example XIII.

Although the invention has been described and illustrated by reference to particular embodiments thereof, it will be understood that in its broadest aspects the invention is not limited to such embodiments, and that variations and substitution of equivalents may be resorted to within the scope of the appended claims.

What is claimed is:

1. A bulk shippable, storage-stable composition comprising an admixture of anhydrous dry particles of a dried biological selected from the group consisting of bacterial vaccines and toxoids, viral vaccines, rickettsial vaccines, antitoxins, immune serums, antivenims, diagnostic antigens, allergenic extracts and enzymatic preparations and, as a suspending agent therefor, an anhydrous liquid polyorganosiloxane.

2. A composition according to claim 1, in which the biological is smallpox vaccine.

3. A composition according to claim 1, in which the biological is Newcastle disease vaccine.

4. A composition according to claim 1, in which the biological is rabies vaccine.

5. A composition according to claim 1, in which the biological comprises a mixture of streptokinase, streptodornase and human plasminogen.

References Cited

FOREIGN PATENTS 1,074,218   2/1960   Germany.

LEWIS GOTTS, *Primary Examiner.*

S. ROSE, *Assistant Examiner.*